Patented Feb. 27, 1940

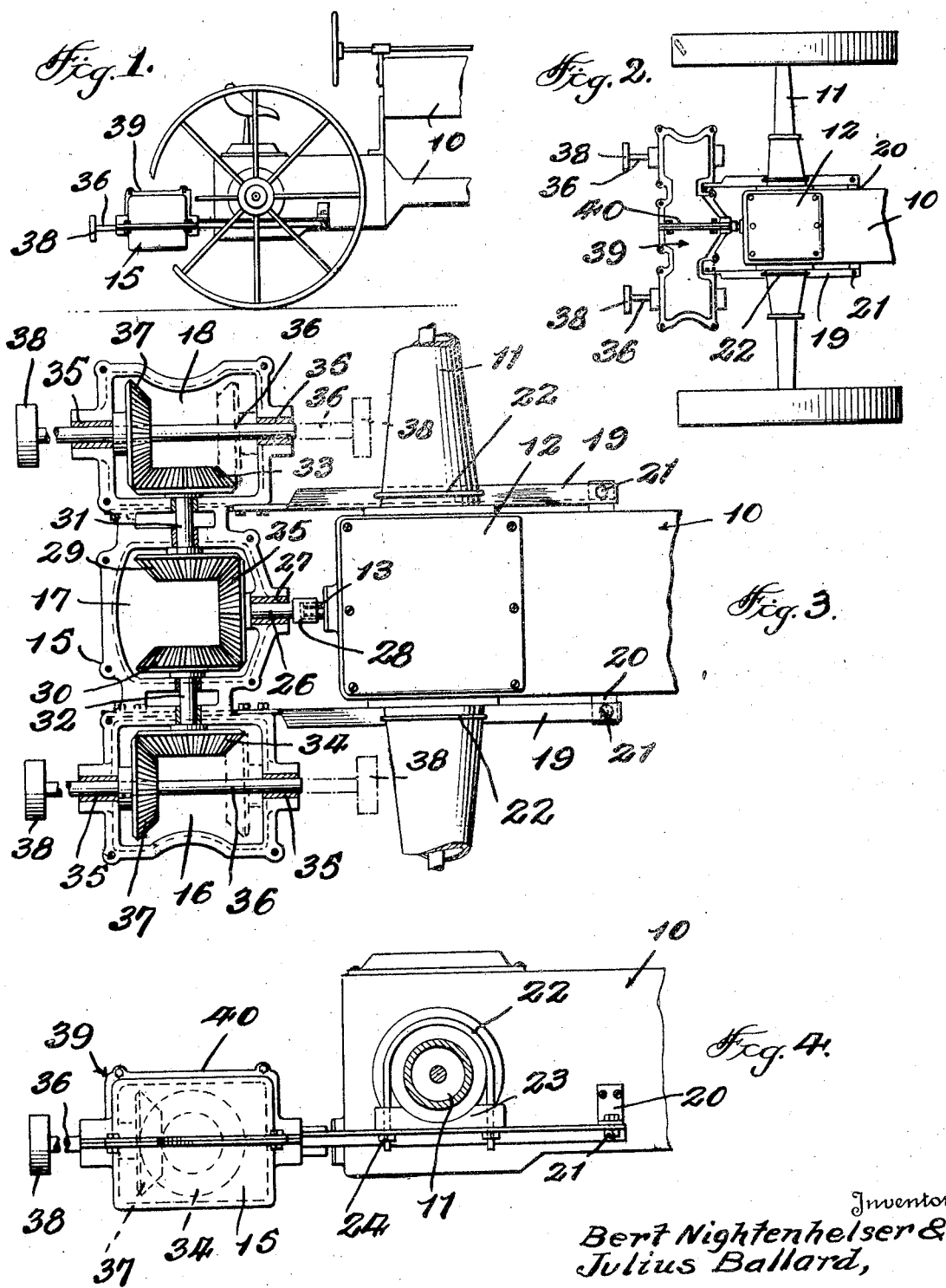

2,192,146

UNITED STATES PATENT OFFICE 2,192,146

POWER TAKE-OFF DRIVE

Bert Nightenhelser, Westfield, and Julius Ballard, Noblesville, Ind.

Application November 29, 1938, Serial No. 242,994

2 Claims. (Cl. 74—11)

This invention relates to a power take-off drive, and it consists in the constructions, arrangements and combinations herein described and claimed.

It is an object of the invention to provide a drive readily applicable to rear end power take-offs generally associated with tractors of present-day constructions.

It is also an object of the invention to provide a gear drive in which the final power take-off may be so positioned as to drive the take-off shaft either in a clockwise or counter-clockwise direction.

It is a still further object of the invention to provide a novel construction of housing whereby one side thereof may be dismantled for change of position of gears, while the other side is not interfered with.

Additional objects, advantages and features of invention will be apparent from the following description considered in conjunction with the accompanying drawing, wherein Figure 1 is a fragmentary side elevation of a tractor with our drive installed.

Figure 2 is a top plan view thereof.

Figure 3 is an enlarged top plan view with the casing cover removed.

Figure 4 is a side elevation of the drive illustrating the mode of attachment to the rear axle of the tractor.

There is illustrated a tractor 10 of conventional construction embodying a rear axle 11, differential 12 and power take-off shaft 13, to which our drive is attachable, as will now be described.

The drive is indicated by the reference character 14, and as shown, comprises a lower housing 15, divided into three separate gear compartments, 16, 17 and 18. For support of the housing, a pair of support bracket arms 19 are bolted to the sides of the compartments 16 and 18, extended forwardly beneath the rear axle 11 of the tractor and thence forwardly to points beneath attaching brackets 20 upon the sides of the tractor, where they are suitably bolted as at 21. A U-shaped collar 22 is suspended upon either side of the differential 12, the ends thereof passing through suitable apertures in a support block 23 beneath the axle housing, and through apertures in the arms 19, the ends of the collar 22 being threaded for reception of nuts 24 for securement of the arms to the axle housing, with consequent support of the drive unit.

The compartment 17 houses a bevel gear 25, the shaft 26 of which is journaled in a bearing 27, the shaft projecting outwardly of the housing and includes a splined connector 28 for attachment to the power take-off shaft 13 of the tractor.

The compartment 17 also houses a pair of bevel gears 29 and 30 in mesh with the gear 25, as clearly shown in Figure 3, the gears 29 and 30 being keyed to respective shafts 31 and 32, the shafts extending transversely across into respective compartments 16 and 18 where respective bevel gears 33 and 34 are keyed. The shafts 31 and 32 will be suitably journalled in bearings as desired.

From the description thus far given, it will be apparent that the power-take-off shaft will impart rotation to the shaft 26 with consequent rotation of the gears 25, 29, 30, 33 and 34.

The compartments 16 and 18 are identical in construction, and comprise end bearings 35 for rotatably supporting a countershaft 36, the countershafts lying in planes parallel with the power take-off shaft 13 and upon the countershafts 36 there is keyed a bevel gear 37, adapted to mesh respectively with gears 33 and 34, all of which is clearly shown in Figure 3. The countershafts 36 project outwardly of the compartments and have fixed thereto a pulley 38, affording a power take-off for machinery to be driven. Obviously, the pulley 38 may be supplanted by a universal joint where a positive drive is desired, and since this is well understood, no illustration of the detail is believed necessary.

The housing 15 will be closed by a top housing 39 divided medially of its length as indicated at 40, and will be suitably bolted to the lower housing 15. By dividing the top section in this manner, it will be possible to remove one or both of the top sections for interchange of the gears 37 to either one side or the other of the gears 33 and 34, as indicated in dotted lines. It will be apparent that the positioning of the gears 37 to one side or the other of gears 33 and 34 will produce clockwise or counter-clockwise rotation of the power take-off pulleys 38, which is often found desirable, particularly with agricultural implements.

The power take-off unit may be filled with oil or other lubricant to effect smooth running of the gears and shaft thereof.

While we have shown and described a preferred form of the drive, this is by way of illustration only, and we consider as our own all such modifications in structure as fairly fall within the scope of the appended claims.

We claim:

1. A power take-off for tractors and the like comprising a housing having means for attachment to a tractor, said housing having a pair of partitions defining a medial and end gear compartments, a shaft journalled in the medial compartment and projecting therefrom for connection with a power take-off of a tractor, a bevel gear on the shaft within the compartment, a shaft journalled in each partition defining the medial compartment and extended from the medial compartment to the next adjacent end compartment, a bevel gear on each end of said shafts, one of the gears of each shaft being in mesh with the first named bevel gear, each of said end compartments having bearings lying in a plane parallel to the power take-off shaft of a tractor, a countershaft journalled in respective pairs of bearings, a bevel gear fixed to each of said last named shafts in mesh with each respective gear in the end compartments, a cover for said compartments divided transversely of its length whereby one or both portions of the cover may be removed for reversing the position of the countershafts to effect meshing engagement of its associated bevel gear with one side or the other of the other bevel gear in respective end compartments, and power take-off means on the countershafts.

2. A power take-off for tractors and the like comprising a housing having means for attachment to a tractor, said housing having partitions defining three gear compartments, a shaft journalled in the medial compartment and having means for connection with a power take-off of a tractor, a bevel gear on the shaft within the compartment, a shaft journalled in each partition defining the medial compartment, a bevel gear on each shaft in mesh with the first named gear, a bevel gear on each end of the last named shafts and positioned in the respective next adjacent compartment, a countershaft journalled in each of the remaining compartments, said countershafts extending in planes parallel to the power take-off shaft of the tractor, a bevel gear on each of the countershafts in mesh with the bevel gear of the respective compartments and a cover for the housing, said cover being divided transversely of its length, whereby one or both portions of the cover may be removed for reversing the positions of the countershafts to mesh their associated gear with one side or the other of its companionate bevel gear, and power take-off means on the countershafts.

BERT NIGHTENHELSER.
JULIUS BALLARD.